US009268110B2

(12) United States Patent
Bueler et al.

(10) Patent No.: US 9,268,110 B2
(45) Date of Patent: Feb. 23, 2016

(54) LENS SYSTEM AND METHOD (71) Applicant: Optotune AG, Stans (CH)

(72) Inventors: Michael Bueler, Zurich (CH); Manuel Aschwanden, Zurich (CH); Chauncey Gratzel, Zurich (CH); David Niederer, Kuttigen (CH)

(*) Notice: Subject to any disclaimer, the term of this patent is extended or adjusted under 35 U.S.C. 154(b) by 0 days.

(21) Appl. No.: 14/184,927

(22) Filed: Feb. 20, 2014

(65) Prior Publication Data
US 2014/0192427 A1    Jul. 10, 2014

Related U.S. Application Data (63) Continuation of application No. 12/720,113, filed on Mar. 9, 2010, now Pat. No. 8,659,835.

(60) Provisional application No. 61/160,012, filed on Mar. 13, 2009.

(51) Int. Cl.
*G02B 15/14* (2006.01)
*G02B 7/04* (2006.01)
*G02B 3/14* (2006.01)
*G02B 27/00* (2006.01)
(Continued)

(52) U.S. Cl.
CPC .. *G02B 7/04* (2013.01); *G02B 3/14* (2013.01); *G02B 27/0025* (2013.01); *H04N 5/2254* (2013.01); *H04N 5/23212* (2013.01)

(58) Field of Classification Search
CPC ........... G02B 26/005; G02B 3/12; G02B 3/14
USPC .................................. 359/642, 665–667, 676
See application file for complete search history.

(56) References Cited

U.S. PATENT DOCUMENTS 3,641,354 A * 2/1972 De Ment ..................... 250/216
3,942,048 A    3/1976 Laude et al.
(Continued)

FOREIGN PATENT DOCUMENTS

CN    1776463    5/2006
DE    19710668    9/1998
(Continued)

OTHER PUBLICATIONS

Aschwanden, M et al. "Diffractive Transmission Grating Tuned by Dielectric Elastomer Actuator"; IEEE Photonics Technology Letters, vol. 19, No. 14 (Jul. 15, 2007).
(Continued)

*Primary Examiner* — James Greece
(74) *Attorney, Agent, or Firm* — Fitch, Even, Tabin & Flannery LLP (57) ABSTRACT An optical system includes a first deformable lens having a membrane with a deformable portion. A sensor is configured to receive the light focused by the first deformable lens. An optical path extends through the first deformable lens and to the sensor. The first deformable lens is tuned according to an applied electrical signal in order to directly focus light traversing the optical path onto the sensor. A first volume of a first optical media and a second volume of a second optical media are defined at least in part by the deformable portion of the membrane. The first volume and the second volume are completely enclosed by the housing. The first volume and the second volume remain substantially constant for all configurations of the first deformable lens.

10 Claims, 9 Drawing Sheets (51) Int. Cl.
*H04N 5/225* (2006.01)
*H04N 5/232* (2006.01)

(56) References Cited

U.S. PATENT DOCUMENTS

| | | | |
|---|---|---|---|
| 4,011,009 A | 3/1977 | Lama |
| 4,115,747 A | 9/1978 | Sato |
| 4,373,218 A | 2/1983 | Schachar |
| 4,494,826 A | 1/1985 | Smith |
| 4,529,620 A | 7/1985 | Glenn |
| 4,629,620 A | 12/1986 | Lindahl |
| 4,709,996 A | 12/1987 | Michelson |
| 4,712,882 A | 12/1987 | Baba |
| 4,783,153 A | 11/1988 | Kushibiki |
| 4,783,155 A | 11/1988 | Imataki |
| 4,802,746 A | 2/1989 | Baba |
| 4,850,682 A | 7/1989 | Gerritsen |
| 5,002,360 A | 3/1991 | Colak et al. |
| 5,066,301 A | 11/1991 | Wiley |
| 5,124,834 A | 6/1992 | Cusano |
| 5,233,470 A | 8/1993 | Wu |
| 5,443,506 A | 8/1995 | Garabet |
| 5,459,610 A | 10/1995 | Bloom |
| 5,581,642 A | 12/1996 | Deacon |
| 5,668,620 A | 9/1997 | Kurtin |
| 5,684,637 A | 11/1997 | Floyd |
| 5,699,468 A | 12/1997 | Farries |
| 5,739,959 A | 4/1998 | Quaglia |
| 5,757,536 A | 5/1998 | Ricco |
| 5,841,579 A | 11/1998 | Bloom |
| 5,867,301 A | 2/1999 | Engle |
| 5,956,183 A | 9/1999 | Epstein |
| 5,999,319 A | 12/1999 | Castracane |
| 6,081,388 A | 6/2000 | Widl |
| 6,088,160 A | 7/2000 | Nomura |
| 6,188,526 B1 | 2/2001 | Sasaya |
| 6,307,663 B1 | 10/2001 | Kowarz |
| 6,326,936 B1 | 12/2001 | Inganas |
| 6,355,756 B1 | 3/2002 | Hawker |
| 6,376,971 B1 | 4/2002 | Pelrine |
| 6,493,515 B2 | 12/2002 | Nagata |
| 6,542,309 B2 | 4/2003 | Guy |
| 6,574,633 B1 | 6/2003 | Jamalabad et al. |
| 6,583,533 B2 | 6/2003 | Pelrine |
| 6,618,208 B1 | 9/2003 | Silver |
| 6,639,710 B2 | 10/2003 | Kurczynski |
| 6,643,065 B1 | 11/2003 | Silberman |
| 6,715,876 B2 | 4/2004 | Floyd |
| 6,747,806 B2 | 6/2004 | Gelbart |
| 6,753,994 B1 | 6/2004 | Russell |
| 6,833,966 B2 | 12/2004 | Nishioka |
| 6,897,995 B2 | 5/2005 | Malthe-Sørenssen et al. |
| 6,898,021 B1 | 5/2005 | Tang |
| 6,903,872 B2 | 6/2005 | Schrader |
| 6,930,817 B2 | 8/2005 | Srinivasan |
| 6,975,459 B2 | 12/2005 | Barbastathis |
| 7,027,683 B2 | 4/2006 | OConnor |
| 7,032,411 B2 | 4/2006 | Hebert |
| 7,042,920 B2 | 5/2006 | Belikov |
| 7,054,053 B2 | 5/2006 | Nishioka |
| 7,054,054 B1 | 5/2006 | Srinivasan |
| 7,088,917 B2 | 8/2006 | Butterworth |
| 7,170,832 B2 | 1/2007 | Tukker |
| 7,230,771 B2 * | 6/2007 | Kuiper et al. ............ 359/665 |
| 7,289,192 B2 | 10/2007 | Otsuka |
| 7,301,708 B2 | 11/2007 | Kuiper |
| 7,317,580 B2 | 1/2008 | Kogo |
| 7,342,733 B2 | 3/2008 | Takei |
| 7,359,124 B1 | 4/2008 | Fang |
| 7,369,723 B1 | 5/2008 | Mescher |
| 7,396,126 B2 | 7/2008 | Blum |
| 7,436,598 B2 | 10/2008 | Kuiper |
| 7,453,646 B2 | 11/2008 | Lo |
| 7,855,838 B2 | 12/2010 | Jannard et al. |
| 8,542,445 B2 | 9/2013 | Bolis |
| 2001/0040743 A1 | 11/2001 | Graves |
| 2001/0055147 A1 | 12/2001 | Little |
| 2002/0118464 A1 | 8/2002 | Nishioka |
| 2002/0186928 A1 | 12/2002 | Curtis |
| 2003/0052425 A1 | 3/2003 | Griffith |
| 2003/0141787 A1 | 7/2003 | Pelrine |
| 2003/0184887 A1 | 10/2003 | Greywall |
| 2003/0194179 A1 | 10/2003 | Rumpf et al. |
| 2003/0214695 A1 | 11/2003 | Abramson |
| 2004/0008853 A1 | 1/2004 | Pelrine |
| 2004/0021929 A1 | 2/2004 | Nishioka et al. |
| 2004/0109234 A1 | 6/2004 | Levola |
| 2004/0212869 A1 | 10/2004 | Srinivasan |
| 2005/0030438 A1 | 2/2005 | Nishioka |
| 2005/0200983 A1 | 9/2005 | Blum |
| 2005/0218231 A1 | 10/2005 | Massieu |
| 2005/0270664 A1 | 12/2005 | Pauker |
| 2006/0028734 A1 | 2/2006 | Kuiper |
| 2006/0164731 A1 * | 7/2006 | Wu et al. ............ 359/666 |
| 2006/0256429 A1 | 11/2006 | Obrebski |
| 2006/0262383 A1 | 11/2006 | Blum |
| 2006/0274425 A1 | 12/2006 | Kuiper |
| 2007/0030573 A1 | 2/2007 | Batchko |
| 2007/0041101 A1 | 2/2007 | Goosey |
| 2007/0097515 A1 | 5/2007 | Jung |
| 2007/0104473 A1 | 5/2007 | Lee |
| 2007/0133103 A1 | 6/2007 | Stempel |
| 2007/0139785 A1 | 6/2007 | Kuiper |
| 2007/0195424 A1 | 8/2007 | Ojala |
| 2007/0223118 A1 | 9/2007 | Dupuis |
| 2007/0263293 A1 | 11/2007 | Batchko |
| 2007/0279732 A1 | 12/2007 | Kosaka |
| 2008/0088756 A1 | 4/2008 | Tseng |
| 2008/0088939 A1 | 4/2008 | Jung |
| 2008/0112059 A1 | 5/2008 | Choi |
| 2008/0142820 A1 | 6/2008 | Edmond |
| 2008/0143693 A1 | 6/2008 | Schena |
| 2008/0144185 A1 | 6/2008 | Wang |
| 2008/0144186 A1 | 6/2008 | Feng |
| 2008/0144187 A1 | 6/2008 | Gunasekaran |
| 2008/0157631 A1 | 7/2008 | Heim |
| 2008/0198438 A1 | 8/2008 | Kuiper |
| 2008/0231963 A1 | 9/2008 | Batchko |
| 2008/0239503 A1 | 10/2008 | Conradi |
| 2008/0247019 A1 | 10/2008 | Kuiper |
| 2008/0252769 A1 | 10/2008 | Verstegen |
| 2008/0259463 A1 | 10/2008 | Shepherd |
| 2009/0002838 A1 | 1/2009 | Yokoyama |
| 2009/0021823 A1 | 1/2009 | Heim |
| 2009/0295982 A1 | 12/2009 | Eguchi |

FOREIGN PATENT DOCUMENTS

| | | |
|---|---|---|
| DE | 102007004080 | 8/2008 |
| EP | 1735644 | 12/2006 |
| EP | 1816493 | 8/2007 |
| EP | 1826591 | 8/2007 |
| EP | 2034338 | 11/2009 |
| FR | 2912514 | 8/2008 |
| JP | 11133210 | 5/1999 |
| JP | 11223735 | 8/1999 |
| JP | 2002014307 | 1/2002 |
| KR | 20050033308 | 4/2005 |
| TW | 200710548 A | 4/2009 |
| TW | 200923464 A | 6/2009 |
| WO | 9102991 | 3/1991 |
| WO | 9948197 | 9/1999 |
| WO | 02103451 | 12/2002 |
| WO | 2005073779 | 8/2005 |
| WO | 2005085930 | 9/2005 |
| WO | 2006011937 | 2/2006 |
| WO | 2006088514 | 8/2006 |
| WO | 2007042602 | 4/2007 |
| WO | 2007067068 | 6/2007 |
| WO | 2007067069 | 6/2007 |
| WO | 2007067070 | 6/2007 |
| WO | 2007069213 | 6/2007 |
| WO | 2007090842 | 8/2007 |
| WO | 2007090843 | 8/2007 |

(56) References Cited

FOREIGN PATENT DOCUMENTS

| WO | 2007096687 | | 8/2007 |
|---|---|---|---|
| WO | 2008020356 | | 2/2008 |
| WO | 2008024071 | | 2/2008 |
| WO | 2008035983 | | 3/2008 |
| WO | 2008076399 | | 6/2008 |
| WO | 2008078320 | | 7/2008 |
| WO | 2008091859 | | 7/2008 |
| WO | 2008100154 | | 8/2008 |
| WO | 2008138010 | | 11/2008 |
| WO | 2009010559 | | 1/2009 |
| WO | 2009010562 | A1 | 1/2009 |
| WO | 2009021344 | | 2/2009 |
| WO | 2010015093 | | 2/2010 |

OTHER PUBLICATIONS

Aschwanden, M et al. "Polymeric, Electrically Tunable Diffraction Grating Based on Artificial"; Optics Letters, vol. 31, No. 17 (Sep. 1, 2006), pp. 2610-2612.

Brady, M.J. "Deformable Rubber Gratings"; IBM Technical Disclosure Bulletin, vol. 23, No. 10 (Mar. 1981), pp. 4761-4762.

Brinker, W. et al. "Deformation Behavior of Thin Viscoelastic Layers Used in an Active-Matrix¬ Addressed Spatial Light Modulator"; SPIE Electro-Optic and Magneto Materials; vol. 1018, 1988, pp. 79-85.

Carvajal, J.J. et al. "Artificial Muscles Employed to Build Tunable Diffraction Gratings"; MRS Bulletin, vol. 31, Oct. 2006.

Sakarya, S. et al. "Spatial Light Modulators Based on Micromachined Reflective Membranes on Viscoelastic Layers"; Laboratory of Electronic Instrumentation, Delft University of Technology; Sensors and Actuators A 108 (2003), www.sciencedirect.com; pp. 271-275.

Sakarya, S. et al. "Technology of Reflective Membranes for Spatial Light Modulators"; Laboratory of Electronic Instrumentation, Delft University of Technology; Sensors and Actuators A 97-98 (2002}, www.sciencedirect.com; pp. 468-472.

Spanner, K. "Survey of the Various Operating Principles of Ultrasonic Piezomotors"; Physik Instrumente GmbH & Co. KG; White Paper for Actuator Conference (2006).

Yan, Dong et al. "Design and Characterization of Slit Variable Microgratings"; IEEE Sensors Journal, vol. 6, No. 2, Apr. 2006. pp. 458-464.

International Search Report for PCT/EP2010/053025 dated, Jun. 8, 2010.

International Search Report dated May 1, 2011 relating to PCT/US2010/026749.

Related International Patent Application No. PCT/EP2010/053025. International Preliminary Report on Patentability and Written Opinion of the International Searching Authority dated Sep. 22, 2011, 5 pages.

Supplemental European Search Report for European Patent Application No. EP10751319, dated Sep. 11, 2012.

European Office Action for Application No. 10 713 147.6-1562, dated May 5, 2015 (5 pages).

* cited by examiner

LENS SYSTEM AND METHOD

CROSS REFERENCES TO RELATED APPLICATIONS

This application is a continuation of prior U.S. application Ser. No. 12/720,113 entitled "Lens System and Method," filed Mar. 9, 2010, which claims benefit under 35 U.S.C. §119 (e) to U.S. Provisional Application No. 61/160,012 entitled "Zoom Lens System and Method," filed Mar. 13, 2009, the contents of both applications is incorporated herein by reference in their entirety.

TECHNICAL FIELD

This patent relates to lenses and methods of operating lenses.

BACKGROUND OF THE INVENTION

Various types of optical systems that utilize different operational principles exist. For instance, an afocal lens has no focusing power and transfers parallel light rays of one beam diameter to parallel light rays of another diameter. By adding a single focusing lens after the afocal system, a parfocal lens is created. In a conventional zoom lens system, only the lens elements of the afocal portion have to be moved forth and back to obtain the zoom effect, while the focusing lens can remain static. Consequently, a parfocal lens stays in focus when magnification/focal lengths are changed.

In another approach, a varifocal lens system is sometimes used in today's optical systems. The varifocal system is not based on the transfer of parallel light rays of one beam diameter to the other. Rather, a first axially movable lens focuses or diverts the light rays towards a second (or third) lens, which is a focusing lens. In order to always obtain a sharp image in the image plane, the focusing lens cannot be static and has to be axially movable or be focus tunable. Thus, a varifocal lens adjusts the position or shape of the final focusing lens when magnification/focal length is changed.

Using either approach, conventional zoom lenses are space consuming, expensive and prone to material wear as several optical elements have to be axially shifted relative to the others by means of motorized translation stages. The potential for miniaturization of such lenses for use in cell phones, medical endoscopes, or other devices where space is at a premium is limited due to their functional principles and operation.

Attempts to overcome the above-mentioned deficiencies have been made in previous systems where focus adjustable lenses were used instead of axially shiftable fixed, non-deformable lenses. In these previous systems, the shape of the lens was changed in order to alter the focal length and other optical properties of the lens.

Unfortunately, these previous approaches still suffered from several disadvantages. More specifically, their potential to sufficiently reduce axial length while providing a high zoom factor and sufficient image size on the image sensor was still limited either due to the chosen zoom principle (e.g., afocal/parfocal systems) or due to the composition or operating principles of the deformable lenses that did not offer sufficient tuning range (e.g., electrowetting lenses or liquid crystal lenses). Consequently, the disadvantages present in these previous systems limited their application and created user dissatisfaction with these previous approaches.

BRIEF DESCRIPTION OF THE DRAWINGS

For a more complete understanding of the disclosure, reference should be made to the following detailed description and accompanying drawings wherein.

In some related figures that show the same or similar elements, for clarity some elements are not labeled. Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Zoom lenses are provided with deformable lenses that overcome the disadvantages of both conventional zoom lenses and previous approaches that utilized deformable lenses. The deformable lenses provided herein are, to give a few examples, tuned at least in part by an element such as an electrostatic actuator, an electromagnetic actuator, a piezo motor, a magnetostrictive actuator, a stepper motor, or an electroactive polymer actuator offering a high focus tuning range. Additionally, the zoom lenses presented herein utilize varifocal operating principles instead of the afocal/parfocal principles. In one example of the present approaches, a single focus tunable lens is used as a single autofocus element.

In many of these embodiments, a compact zoom lens includes a first deformable lens that is constructed of a membrane with a deformable portion and a filler material. In these approaches, deformation is achieved at least in part by an element such as an electrostatic actuator, an electromagnetic actuator, magneto-strictive actuator, a piezo motor, a stepper motor, or an electroactive polymer actuator.

The lens can also include a static diverging lens of radius of curvature that provides sufficient magnification of the image on the sensor. For example, the radius may be as small as approximately 1.5 mm thereby providing a highly negative focusing power. The lens further includes a second deformable lens constructed of a membrane with a deformable portion and a filler material that serves as a zoom element directing light rays from various field angles to a desired image size on a sensor. Further, the lens includes a sensor (e.g., a sensor chip) sensing the image formed by the optical system. So configured, the lens exhibits the characteristics of deformable lenses and has very high tuning ranges. Additionally, the lens follows the varifocal principle of optical systems instead of the afocal/parfocal principle (i.e., the second deformable lens acts as a focus element directly focusing the light rays onto the sensor chip).

In others of these embodiments, the zoom lens includes one or more phase plates or corrective lens elements for the correction of monochromatic aberrations of single lenses or of the entire optical system. In some examples, an achromatic element is placed in front or behind the second deformable lens serving the purpose of correcting for chromatic aberrations. In still other examples, a field-compensating flattener lens is placed behind the second deformable lens serving the purpose of correcting for the field-curvature of the optical system.

In yet others of these embodiments, an optical system consisting of only the first deformable lens and constructed from a membrane with a deformable portion and a filler material is provided. Alternatively, the optical properties of the first deformable lens may be adjusted by an element such as an electrostatic actuator, an electromagnetic actuator, magneto-strictive actuator, a piezo motor, a stepper motor, or an electroactive polymer actuator to serve as an autofocus element. Using either approach, light beam cones from various object distances are focused sharply onto a sensor. A phase plate or corrective lens element for the correction of monochromatic aberrations may also be used in these approaches.

Consequently, the present approaches use two (or potentially more) deformable lenses together with a number of fixed, non-deformable optical elements to create a very compact varifocal system. The adjustable lenses are constructed of a membrane with a deformable portion and a filler material and deformation is achieved at least in part by an element such as an electrostatic actuator, an electromagnetic actuator, magneto-strictive actuator, a piezo motor, a stepper motor, or an electroactive polymer actuator. So configured, they are able to provide very high tuning ranges superior to other lens tuning technologies such as electrowetting or liquid crystals. Additionally, phase plates or corrective lens elements for the correction of monochromatic aberrations can be used in conjunction with the deformable lenses used in the zoom lenses.

As mentioned and in contrast to previous zoom systems, the zoom lenses described herein do not operate according to the afocal/parfocal principle that is space consuming and requires a large number of optical elements. Instead, the lenses and the system where these lenses are deployed operate according to the varifocal principle in order to drastically reduce both axial length and the number of optical elements needed for zooming. Generally speaking and to mention one example, a first deformable lens together produces light ray bundles of varying angles of beam spread while a second deformable lens acts as a focus element directly focusing the light rays onto a sensor.

In contrast to the varifocal operating principle, an afocal lens has no focusing power and transfers parallel light rays of one beam diameter to parallel light rays of another diameter. By adding a single focusing lens after the afocal system or elements, a parfocal lens is created. In previous zoom systems, only the lens elements of the afocal portion are moved to obtain the zoom effect, while the focusing lens can remain at a fixed position. Put another way and as used herein, a parfocal lens is a lens that stays in focus when magnification/focal length is changed.

A varifocal lens system is not based on the transfer of parallel light rays from one diameter to another. In order to always obtain a sharp image on the sensor, the focusing lens is not static. Put another way and as used hereon, a varifocal lens adjusts position or shape of the final focusing lens when the magnification/focal length is changed. In other words, a varifocal lens is a non-fixed focal length lens where the focus changes with focal length.

In many of these embodiments, an optical system includes a first deformable lens, a sensor, and an optical path. The first deformable lens includes a membrane with a deformable portion. The sensor is configured to receive the light focused by the first deformable lens and the optical path extends through the first deformable lens and to the sensor. The first deformable lens is tuned according to an applied electrical signal in order to directly focus light traversing the optical path onto the sensor. A first volume of a first optical media and a second volume of a second optical media are defined at least in part by the deformable portion of the membrane. The first volume and the second volume are completely enclosed by the housing. The first volume and the second volume remain substantially constant for all configurations of the first deformable lens.

In some aspects, the first deformable lens is deformed at least in part by an element such as an electrostatic actuator, an electromagnetic actuator, magneto-strictive actuator, a piezo motor, a stepper motor, or an electroactive polymer actuator. Other examples are possible.

In other aspects, a second deformable lens is disposed within the optical path. The second deformable lens operates with the first deformable lens to focus light traversing the optical path onto the sensor. In some examples, the first and second deformable lenses are tuned according to the applied electrical signal in order to directly focus light traversing the optical path onto the sensor according to a varifocal operation. In another example, the first deformable lens and the second deformable lens are tuned at least in part by an element such as an electrostatic actuator, an electromagnetic actuator, magnetostrictive actuator, a piezo motor, a stepper motor, or an electroactive polymer actuator. Other examples of actuator elements are possible.

In some of these examples, the first deformable lens is configured to change from a concave shape to a convex shape. In other examples, the second deformable lens is configured to change from a convex shape to a concave shape.

A corrective fixed lens element may also be deployed and the corrective fixed lens element is integral with the first focus-adjustable lens and the corrective fixed lens is in contact with the deformable material of the deformable lens and configured to correct for monochromatic or polychromatic aberrations. In some approaches, the corrective fixed lens element is constructed from a rigid material (e.g., glass or polycarbonate or PMMA or cycloolefinpolymers or copolymers). In some examples, an aperture stop is disposed between the two deformable lenses. In other approaches, the aperture stop is disposed inside the first deformable lens.

In other aspects, a fixed, non-deformable lens is disposed in the optical path. The fixed, non-deformable lens is constructed from a rigid material, and the fixed, non-deformable lens is configured to correct for monochromatic or spherical aberrations.

In still other aspects, at least one fixed, non-deformable lens is disposed in the optical path. The fixed, non-deformable lens may be constructed from a rigid material, and the fixed, non-deformable lens is configured to correct for polychromatic aberrations.

In other examples, a corrective lens disposed in the optical path. The corrective lens is constructed from a rigid material (e.g., glass or polycarbonate or PMMA or cycloolefinpolymers or copolymers) and the corrective lens is disposed between a deformable lens closest to the sensor and the sensor.

In many of these approaches, the total axial length of the optical system is reduced to a value L such that the lens is able to produce a zoom factor k for an image sensor with a diagonal d, having a ratio r=L/(k*d). The ratio r is less than approximately 0.7 while producing an image size to completely illuminate the sensor in a fully zoomed state.

The actuation signals can also originate from various sources. For example, the actuation signals may be manually generated signals or automatically generated signals.

In others of these embodiments, a lens system includes a first deformable lens, a corrective optical element, a sensor, and an optical path. The first deformable lens includes a filler material. The corrective optical element is in contact with the filler material. The sensor is configured to receive the light focused by the first deformable lens. The optical path extending through the first deformable lens and the corrective element, and to the sensor. The first deformable lens is tuned according to an applied manual or automatic electrical signal in order to directly focus light traversing the optical path onto the sensor and the corrective element adjusts at least one property of the light traversing the optical path.

The first deformable lens may be tuned at least in part by an element such as an electrostatic actuator, an electromagnetic actuator, a piezo motor, a magnetostrictive actuator, a stepper motor, and an electroactive polymer actuator. Other examples of actuator elements are possible.

In other examples, a second deformable lens is disposed within the optical path and the second deformable lens operates with the first adjustable lens to focus light traversing the optical path onto the sensor. In many of these examples, the first deformable lens and the second deformable lens are tuned at least in part by an element such as an electrostatic actuator, electromagnetic actuator, a piezo motor, a magnetostrictive actuator, a stepper motor, and an electroactive polymer actuator.

In other aspects, the interface defined by the corrective optical element and the filler material has no inflection points in its shape where the design light rays pass through. An inflection point that exists in the shape in these elements is generally undesirable as it relates to the temperature sensitivity. If the optical surface has an inflection point, any additional surface order beyond two (quadratic) in the interface between the filler material and the corrective lens element leads to an increased deterioration of the image quality when the temperature deviates from the design temperature as a result of an increased sensitivity to differences in the refractive indices. The elimination of any inflection point eliminates or substantially eliminates these problems.

The corrective lenses described herein may include a front surface and back surface that are configured into a shape. The shape may be a wide-variety of shapes such as spherical or aspherical shapes or they may be described by higher-order polynomials producing for instance an m-like shape with a aspherical coefficients of order equal to or larger than approximately four or a w-like shape with a aspherical coefficients of order equal to or larger than approximately four. Other examples of shapes are possible.

Figure 1A:
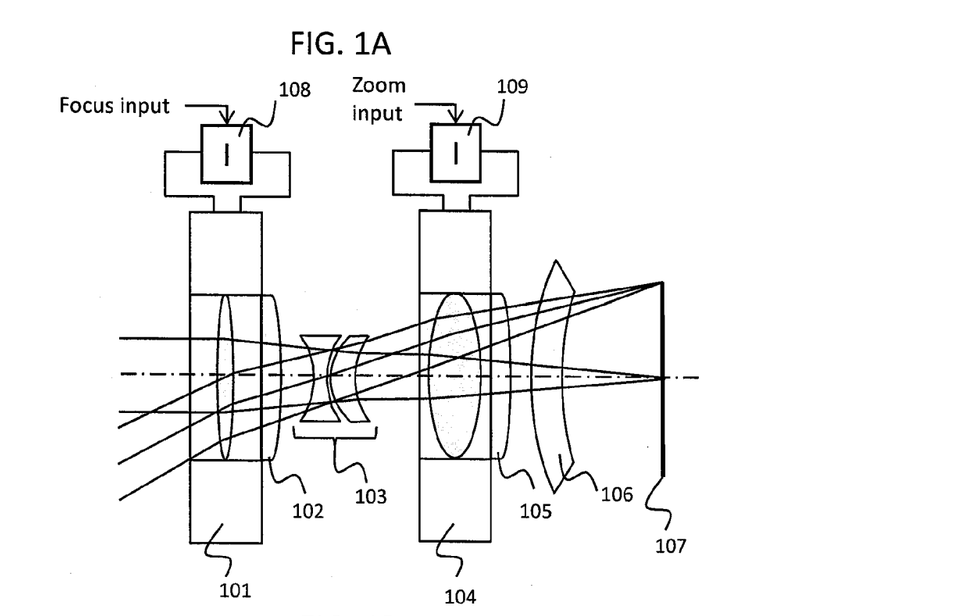
FIGS. 1A and 1B comprise a diagram of a lens system according to principles of the present invention.

Referring now to the figures and particularly to FIG. 1A, one example of a zoom lens in the un-zoomed wide-angle state (e.g., zoom factor=1) is described. A first deformable lens 101 is shown in a state of low focusing power. A first phase plate or corrective lens element 102 is optionally used to correct for monochromatic aberrations of the lens such as spherical aberration or for chromatic aberrations. A lens group 103 consists of one or more fixed, non-deformable lenses serving the purpose of supporting the zoom functionality of the following second deformable lens 104 and for correcting monochromatic aberrations such as spherical aberration or chromatic aberrations.

The second deformable lens 104 is in a state of high focusing power focusing the light onto the image sensor 107 following the varifocal principle of operation. A second phase plate or corrective lens element 105 is used to correct for monochromatic or polychromatic aberrations. A field-compensating flattener lens 106 is used serving the purpose of correcting for the field-curvature of the optical system. The image is finally formed on an image sensor 107. In some examples, the corrective lenses or lens groups 103 or 106 may be omitted or further corrective elements may be used.

The shape of the first deformable lens 101 and the second deformable lens 104 may be changed using an element such as an electrostatic actuator, an electromagnetic actuator, a piezo motor, a magnetostrictive actuator, a stepper motor, and an electroactive polymer actuator.

Deformable lens 101 is voltage or current controlled by a first voltage or current control element 108 with the input signal coming from an automatic or manual operation. An automatic operation might be an autofocus algorithm. The autofocus algorithm is any type of algorithm that provides inputs that autofocus an image. Such autofocus algorithms are well know to those skilled in the art and will not be described further herein. A second deformable lens 104 is voltage or current controlled by a second voltage or current control element 109 with the input coming from an automatic or manual operation.

Any of the tunable or deformable lenses described herein can be adjusted according to any approach described in U.S. patent application Ser. No. 12/720,093, filed Mar. 9, 2010, and issued as U.S. Pat. No. 8,699,141 on Apr. 15, 2014, entitled "Lens Assembly System and Method," the contents of which are incorporated herein in their entirety. Other tuning approaches may also be used.

The image sensor 107 may be any type of sensing device. Any image sensor based on CCD or CMOS technology may be used. Such image sensors are typically used in any digital camera or cell phone camera and they feature various pixel numbers such as 3 megapixels or 12 megapixels. One example of an image sensor is the Omnivision Inc. OV5630 1/3.2" 5 megapixel sensor. Other image sensing technologies and/or sensing chips may also be employed.

Figure 1B:
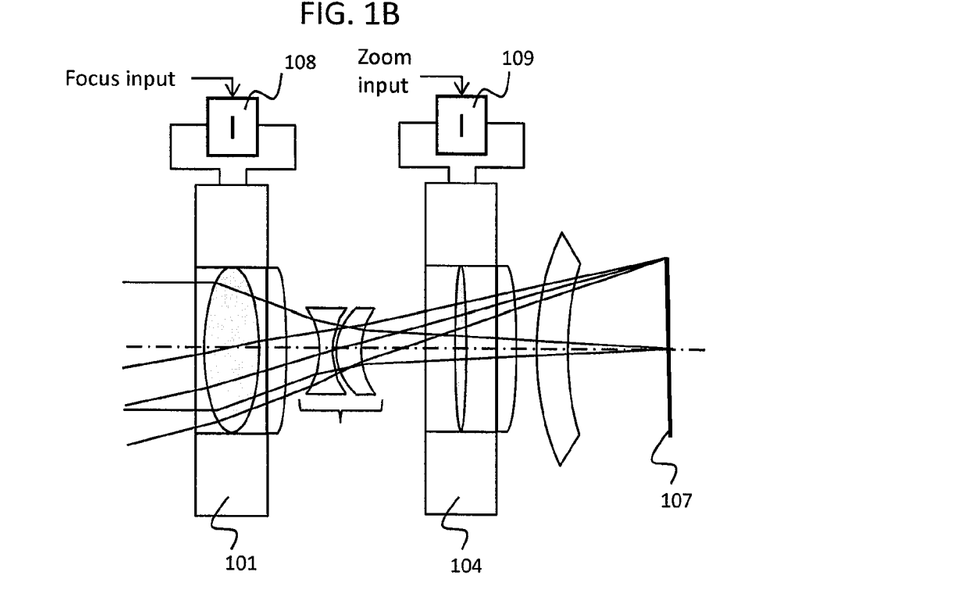

Referring now to FIG. 1B, the same zoom lens of FIG. 1A now in the fully-zoomed tele-photo state (zoom factor>approximately 2.5) is described. As shown, the first deformable lens 101 is in a state of high focusing power while the second deformable lens 104 is in a state of low or even negative focusing power in order to focus the light ray bundles onto the image sensor 107.

As with the example of FIG. 1A, the first deformable lens 101 and the second deformable lens 104 change shape because surface deformation is achieved with an element such as an electrostatic actuator, an electromagnetic actuator, a piezo motor, a magnetostrictive actuator, a stepper motor, and an electroactive polymer actuator. As with the example of FIG. 1A, increasing the current or voltage increases or decreases the focusing power of the lens. In order to activate zooming the user may press a button that initiates the changing of the shape of the second deformable lens (e.g., via application of a voltage or current to the lens) while the first deformable lens is automatically adjusted by the autofocus algorithm as described elsewhere herein.

Also as with the example of FIG. 1A, deformable lens 101 is voltage or current controlled by the first voltage or current control element 108 with the input signal coming from an automatic or manual operation. The second deformable lens 104 is voltage or current controlled by the second voltage or current control element 109 with the input coming from an automatic or manual operation. The autofocus algorithm is any type of algorithm that determines focus adjustments for the lens and provides inputs to the first voltage or current control element 108 or to the second voltage or current control element 109 indicating these adjustments. The voltage or current control element 108 adjusts its voltage or current thereby altering the optical characteristics of the lens 101, and consequently, autofocusing an image. The first voltage or current control element 108 and the second voltage or current control element 109 are any combination of analog or digital electronic components that receive an input signal (e.g., a user input or a signal from an autofocus algorithm) and use the signal to directly or indirectly adjust the shape of the first deformable lens 101 or the second deformable lens 104.

More specifically, the shape of the lens can be adjusted according to several approaches. In addition to the approaches described herein, other approaches are possible. In one example, the voltage or current control elements may receive a voltage or current and based upon the received voltage or current, directly apply a voltage or current to the lens via an electrical lead that directly contacts the lens.

The fixed, non-deformable lenses (i.e., all lenses having shapes that are not deformable or focus adjustable) of the present approaches can be formed in any number of ways. For instance, the static lenses in FIGS. 1A and 1B such as the first phase plate or corrective lens element 102 (e.g., a cover glass compensator), the lens group 103 (e.g., divergent lens or meniscus lens) or the flattener lens 106 (e.g., used for the compensation of field-curvature) can be formed by injection molding techniques with materials such as glass or polycarbonate or PMMA or cycloolefinpolymers or copolymers. Other formation approaches and materials such as glass can also be used.

Furthermore, additional deformable lenses may be used if necessary and/or advantageous. In some approaches, two deformable lenses achieve great efficiencies. However, more deformable lenses could be used in other examples. For example, a third deformable lens may be employed and is used for various purposes such as increasing optical quality or increasing zoom range.

Figure 2A:
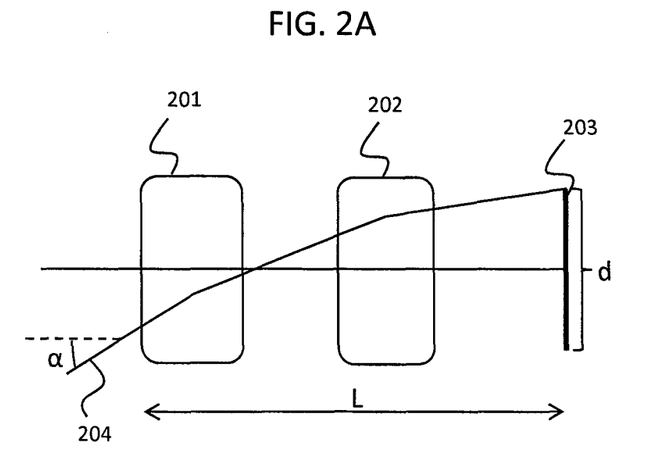
FIGS. 2A and 2B comprise block diagrams of a zoom lens system according to principles of the present invention.
Figure 2B:
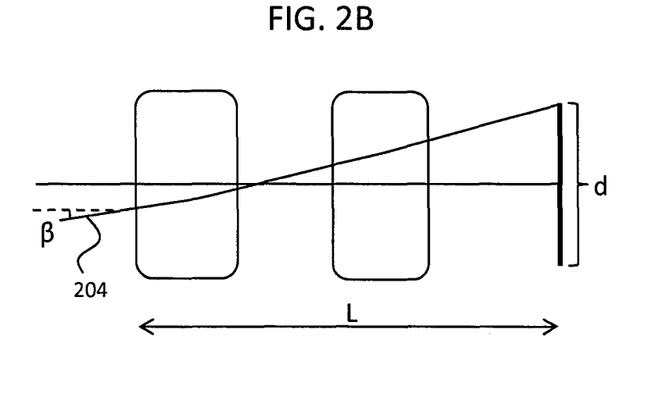

Referring now to FIGS. 2A and 2B, a schematic zoom lens in the un-zoomed wide-angle state (shown in FIG. 2A) and the fully-zoomed tele-photo state (shown in FIG. 2B) with the optical chief ray 204 symbolizing the path of light rays in the system is described. The zoom lens consists of a first lens group 201 consisting in part of a deformable lens and one or more corrective lens elements and a second lens group 202 consisting in part of a deformable lens and one or more corrective lens elements, and an image sensor 203. The corrective elements within the various lens groups are fixed, non-deformable lenses with specially shaped surfaces for the compensation of various types of optical errors. Additionally, infrared radiation (IR) filters or ultraviolet (UV) filters can be used. The entire system of FIGS. 2A and 2B has a total length L. As shown in FIG. 2A, light rays entering the lens from a distant object under an angle alpha can be imaged to an image height corresponding to half the total diagonal d (where d is a measurement of length) of the sensor chip 203. As shown in FIG. 2B, the zoom factor is increased. More specifically, as shown in FIG. 2B, an optical chief ray 204 entering the system under an angle beta which is smaller than the angle alpha of FIG. 2A is imaged to an image height corresponding to half the total diagonal d of the sensor chip. The zoom factor k of the system is defined as the tangent of angle alpha divided by the tangent of angle beta. In many of the approaches presented herein, the total axial length of the optical system is reduced to a value L such that the lens is able to produce a zoom factor k for an image sensor with a diagonal d, having a ratio $r=L/(k*d)$. The ratio r is less than approximately 0.7 while producing an image size to completely illuminate the sensor in both the un-zoomed (wide-angle) and the fully zoomed (telephoto) state.

Figure 3:
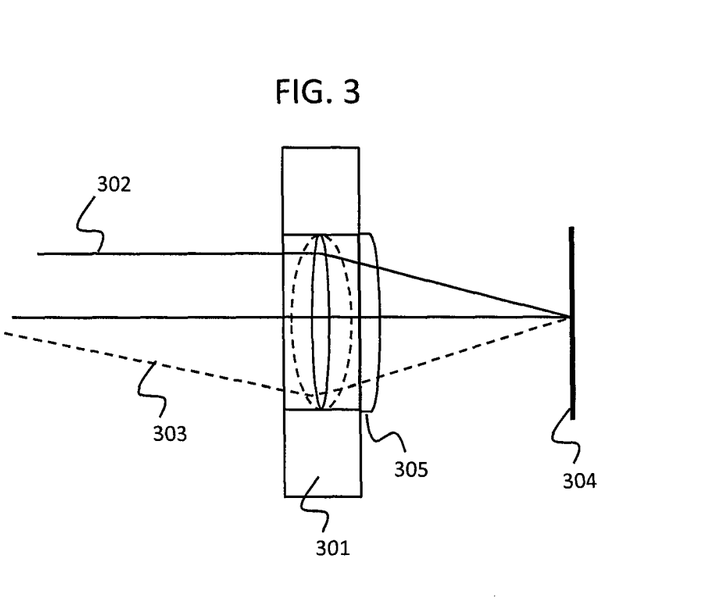
FIG. 3 comprises a diagram of a lens system according to principles of the present invention.

Referring now to FIG. 3, a single autofocus element is described and is used independently (or with other components as part of an optical system). For example, the first or second deformable lens which is operated with an element such as an electrostatic actuator, an electromagnetic actuator, a piezo motor, a magnetostrictive actuator, a stepper motor, and an electroactive polymer actuator (e.g., element 101 of FIGS. 1A, 1B) is used as an autofocus element focusing light beam cones from various object distances sharply onto a sensor (e.g., a sensor chip). A phase plate or corrective lens element or lens stack with a range of corrective, non-deformable lenses can be optionally used to correct for monochromatic aberrations of the lens such as spherical aberration or to correct for polychromatic aberrations.

A deformable lens 301 adapts to the object distance by adjusting its refractive power. Light rays of distant objects 302 are focused sharply onto an image sensor 304 by reducing the focusing power (solid lines), while light rays from close objects 303 are focused onto the image sensor 304 by increasing the focusing power (dashed lines). An optional phase plate or corrective lens element 305 can be used to compensate for monochromatic or polychromatic aberrations of the focus tunable lens. A voltage or current control element (not shown) is used to control the shape of the deformable lens 301 and hence tune the focusing power. The voltage or current applied is controlled by an autofocus algorithm.

The various elements of FIG. 3 can be similar in construction to similar elements of FIGS. 1A and 1B. For example, the deformable lens 301 may be constructed of a membrane with a deformable portion and a filler material, the deformation being achieved at least in part by applying a voltage or current to an element such as an electrostatic actuator, an electromagnetic actuator, magneto-strictive actuator, a piezo motor, a stepper motor, or an electroactive polymer actuator. For example, a voltage or current control element may directly control the voltage or current.

The image sensor 304 may be any type of image sensing device. As with the other sensors described herein, any image sensor, for example, based on CCD or CMOS technology, could be used. Other technologies for image sensing could also be employed. One example of an image sensor is the Omnivision Inc. OV5630 1/3.2" 5 megapixel sensor. Other examples of sensors are possible.

The approaches herein provide lens arrangements that are applicable in a wide variety of applications. For example, they can be used in cellular phones, digital cameras of any type, and medical endoscopes to name a few examples. Other examples of devices where these approaches may be employed are possible.

As mentioned, various materials may be used in the construction of the lens 301. As for an electroactive polymer, any elastomer such as the 20190 polymer available from Cargill Inc. (with coatings that serve as electrodes) could be used. Magnetic tuning can be achieved with any voice coil motor structure.

Figure 4A:
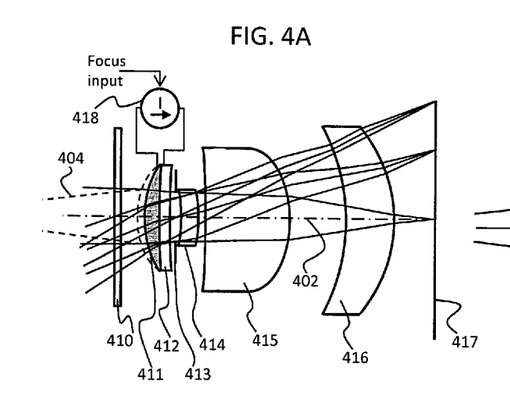
FIGS. 4A, 4B, 4C and 4D comprise a diagram of a lens system according to various embodiments of the present invention.
Figure 4B:
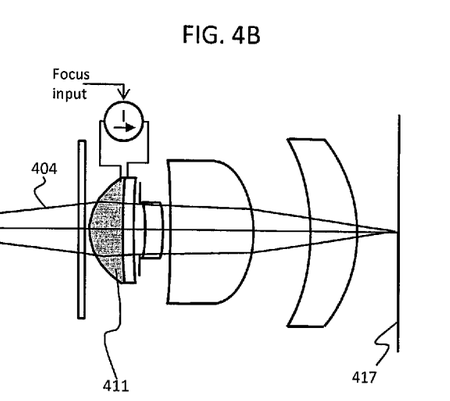

Referring now to FIGS. 4A and 4B another example of a lens system that includes four lens elements is described and operates as an autofocus system. The example of FIG. 4A depicts the state of the system when the lens is focused on an object at infinity. An optical path extends along (at and on either side of) an optical axis labeled 402 and passes through the center of the elements shown. A first lens element 411 is a deformable lens based that operates according to an electroactive polymer technology, using one or more magnetic tuning actuators, using one or more piezoelectric actuators, using one or more magnetostrictive actuators, or using one or more electrostatic actuators. A cover 410 (e.g., constructed from glass) can be deployed to protect the deformable lens surface of the lens element 411. A corrective element 412 is disposed so as to be in contact with the deformable lens material (e.g., filler material within the first lens element). In this respect, the corrective element 412 is incorporated with the first lens element 411. The corrective element 412 corrects monochromatic and polychromatic aberrations. A fixed, non-deformable corrective lens 414, in one function, corrects spherical aberration and other monochromatic aberrations and follows the aperture stop 413 along the optical axis 402. A fixed, non-deformable lens 415 is followed along the axis 402 by a flattener lens 416 that, in one function, eliminates field-curvature. The image that is transferred by the light rays (as these rays traverse along the axis 402) is finally formed in the image sensor plane 417. The image sensor may be any type of sensing device. Any image sensor based on CCD or CMOS technology may be used. Such image sensors are typically used in any digital camera or cell phone camera and they feature various pixel numbers such as 3 megapixels or 12 megapixels. One example of an image sensor is the Omnivision Inc. OV5630 1/3.2" 5 megapixel sensor. Other image sensing technologies and/or sensing chips may also be employed. The deformable lens 411 is current or voltage controlled 418 with the input coming from the autofocus algorithm. The dashed lines in FIG. 4A illustrate light rays 404 originating from an object that is relatively close to the lens (e.g. closer than approximately 500 mm) and the additional deflection of the deformable lens 411 necessary to focus the object onto the image plane 417.

FIG. 4B illustrates the same system as that of FIG. 4A. However, in this example, the state of the system has changed and the object is closer to the system than the object whose image is projected in FIG. 4A. The elements in FIG. 4B are the same as those shown in FIG. 4A and their description will not be repeated here. As shown in FIG. 4B, rays 404 (from the object) entering the lens under a divergent angle are focused sharply onto the image plane 417 due to the change in curvature of the lens element 411.

In other examples, a zoom system can be constructed based on the autofocus lens depicted in FIGS. 4A-B. In this case, the zooms lens system uses two deformable lenses together with a number of fixed, non-deformable optical elements to create a very compact varifocal-based system. Examples of zoom systems are described in detail elsewhere herein.

As with the lens 411 in the autofocus system, the deformable lenses in the zoom system are constructed according to electroactive polymer technology, are magnetically tunable, use piezoelectric actuators, use magnetostrictive actuators, or use electrostatic actuators. So configured, the lenses are able to provide very high tuning ranges superior to other lens tuning technologies such as electrowetting or liquid crystals. Additionally, phase plates or corrective lens elements for the correction of monochromatic aberrations can be used in conjunction with the deformable lenses used in the zoom lens.

Figure 4C:
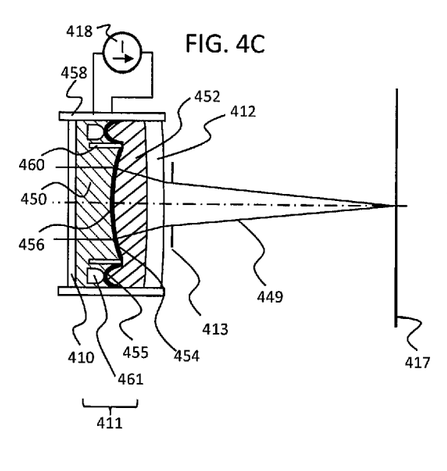
Figure 4D:
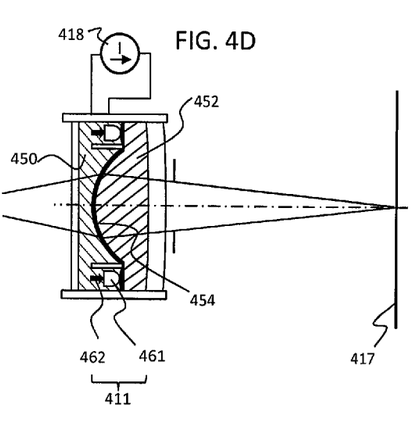

In the examples of FIGS. 4C and 4D, the first deformable lens 411 includes a deformable membrane 454. An annular lens shaping structure 460 divides the membrane 454 into a central, optically active part 456, and a peripheral, not optically active part 455. As mentioned, the sensor 417 is configured to receive the light focused by the first deformable lens 411 and the optical path 449 extends through the first deformable lens 411 and to the sensor 417. The first deformable lens 411 is tuned according to the applied electrical signal 418 via a mechanical linkage structure 461 in order to directly focus light traversing the optical path onto the sensor 417. A first volume 450 (depicted in one style of cross-hatching) of a first optical media (e.g., air) and a second volume 452 (depicted in another style of cross-hatching) of a second optical media (e.g., filler material) are defined at least in part by the deformable membrane 454. The first volume 450 and the second volume 452 are completely enclosed by a housing 458. That is, these volumes do not extend outside the housing 458. The first volume 450 and the second volume 452 remain substantially constant for all configurations of the first deformable lens 411. A corrective optical element 412 is incorporated with the first deformable lens element 411 and it is in contact with the second volume 452. Indeed, as other deformable lenses are added to the system of FIG. 4 (to construct other types of systems), it will be appreciated that similar new volumes may be defined by these new elements, and that these similar new volumes will remain constant or substantially constant with respect to the each other (as the first and second volumes remain constant with respect to each other).

FIG. 4D illustrates the same system as that of FIG. 4C. However, in this example, the state of the system has changed and the object is closer to the system than the object whose image is projected in FIG. 4C. The curvature of the deformable lens 411 is increased according to the applied electrical signal 418 by moving the mechanical linkage structure 461 in the direction of the sensor 417 (direction of movement indicated by 462). In this process the first volume 450 and the second volume 452 remain separated by the deformable membrane 454 and they remain substantially constant. Referring now to FIGS. 5A, 5B, 5C, and 5D depicts other examples of autofocus lenses are described. The system includes a cover 510, a deformable lens 520, an aperture stop 513, a fixed, non-deformable lens 515, a flattener lens 521, a corrective lens 514, and an image sensor plane 517. These components are similar to the corresponding elements of FIG. 4 and will not be described again here.

Figure 5A:
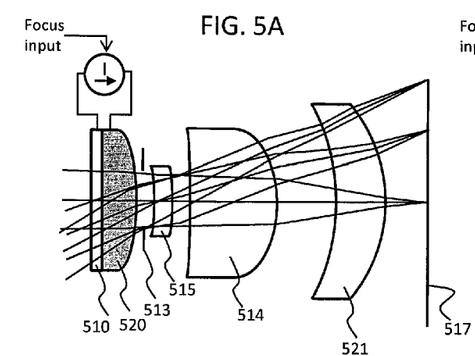
FIGS. 5A, 5B, 5C and 5D comprise a diagram of a lens system according to various embodiments of the present invention.
Figure 5B:
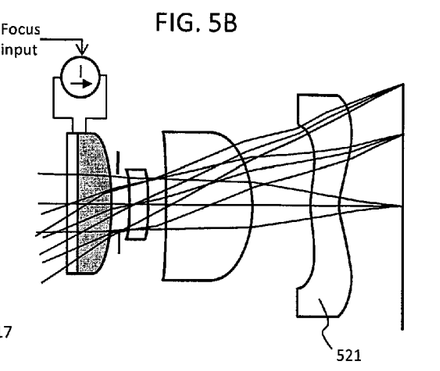
Figure 5C:
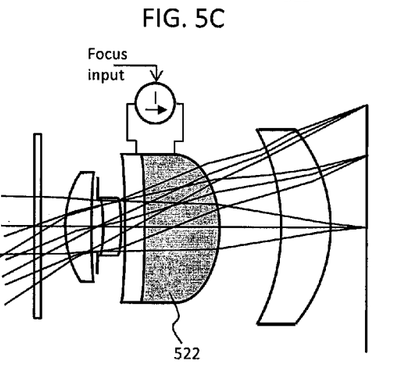
Figure 5D:
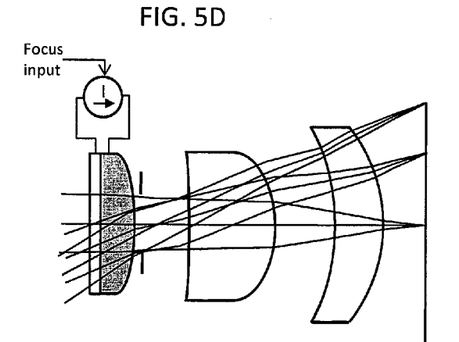

In FIG. 5A, the system is shown in a state where the deformable lens 520 is inverted and the change in lens curvature takes place in the direction of the image sensor plane 517. FIG. 5B shows the system with the deformable lens 520 using an m- or w-like shaped flattener lens 521 for the correction of field-curvature and higher order aberrations. In the example of FIG. 5C the deformable lens 522 is positioned as the third lens element instead of the first lens element. In the lens system depicted in FIG. 5D only three separate lens elements are used instead of four lenses. Various combinations of these examples are possible.

Figure 6A:
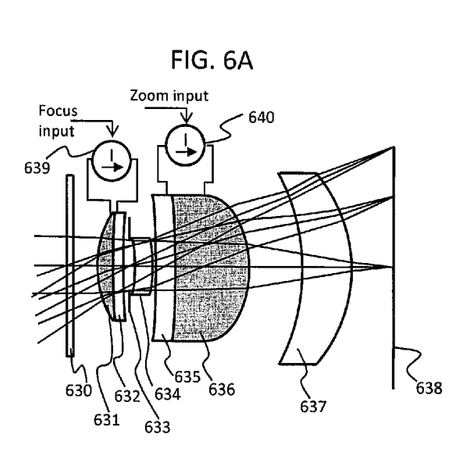
FIGS. 6A and 6B comprise a diagram of a lens system according to various embodiments of the present invention.
Figure 6B:
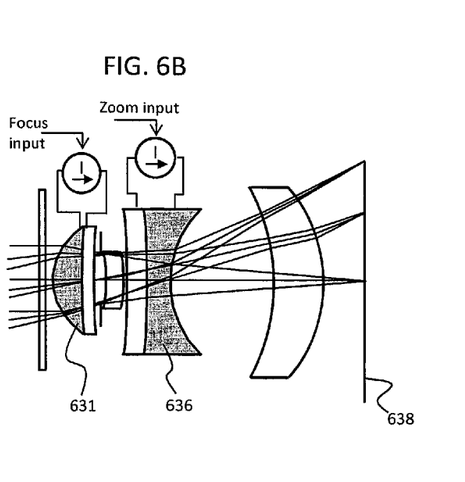

Referring now to FIGS. 6A and 6B, another example of a lens system is described. FIG. 6A depicts one example of a zoom lens in the un-zoomed state (i.e., wide-angle mode, zoom factor=1). A first deformable lens 631 is in a state of low focusing power. A cover 630 (e.g., constructed from glass)

may be used to protect the deformable lens surface. A corrective element 632 is in contact with the deformable lens material (e.g., the filler material within the lens 631) and corrects monochromatic and polychromatic aberrations. An aspheric corrective lens 634, in one function, corrects spherical aberration follows the aperture stop 633. A second deformable lens 636 with positive focal power is in contact with an aberration correcting element 635. The second deformable lens 636 functions to change the zoom state of the zoom lens. A flattener lens 637 functions in one example to eliminate field curvature is placed in front of an image sensor 638. The deformable lenses 631 and 636 are current controlled by control inputs 639 and 640. The control input 639 of the first deformable lens 631 originates from an autofocus algorithm and the control input 640 of the second deformable lens 636 originates from the zoom input that is determined by the user (e.g., manual control of or adjustment by the user).

FIG. 6B depicts the same zoom lens of FIG. 6A in the fully-zoomed state (i.e., telephoto mode, zoom factor>approximately 2.5). The first deformable lens 631 is in a state of high focusing power while the second deformable lens 636 is in a state of negative focusing power in order to focus the light ray bundles onto the sensor chip 638). By "high focusing power" it is meant focal lengths smaller than approximately 5.0 mm (focal powers larger than approximately 200 diopters) are used and by "negative focusing power" it is meant that focal lengths are between approximately −4.0 mm and 0 mm (focal powers more negative than approximately −250 diopters) are used. The capability of one or both of the focus-adjustable lenses provides both positive and negative refractive power (i.e., convex and concave shapes).

Referring now to FIGS. 7A, 7B, 7C, 7D, 7E, and 7F, other examples of a zoom lens system is described. A first deformable lens 731 is in a state of low focusing power. By "low focusing power" it is meant focal lengths larger than approximately 12.0 mm. A cover 730 (e.g., constructed from glass) may be used to protect the deformable lens surface. A corrective element 732 is in contact with the deformable lens material (e.g., the filler material within the lens 731) and corrects monochromatic and polychromatic aberrations. An aspheric corrective lens 734, in one function, corrects spherical aberration follows the aperture stop 733. As second deformable lens 736 with positive focal power is in contact with an aberration correcting element 735. The second deformable lens 736 functions to change the zoom state of the zoom lens. A flattener lens 740 functions in one example to eliminate field-curvature is placed in front of an image sensor 738. The deformable lenses 731 and 736 are current or voltage controlled by control inputs 739 and 741. The control input 739 of the first deformable lens 731 originates from an autofocus algorithm and the control input 741 of the second deformable lens 736 originates from the zoom input that is determined by the user (e.g., manual control of or adjustment by the user).

Figure 7A:
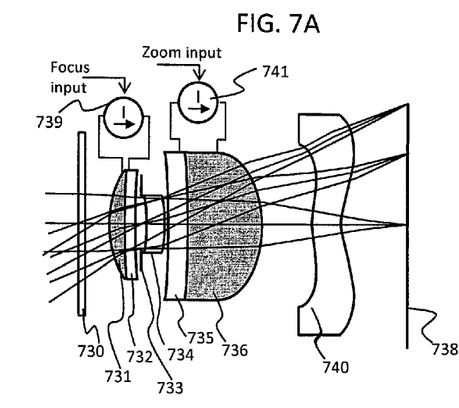
FIGS. 7A, 7B, 7C, 7D, 7E, and 7F comprise a diagram of a lens system according to various embodiments of the present invention.
Figure 7B:
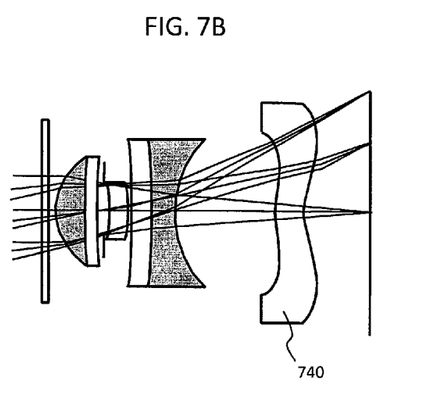
Figure 7C:
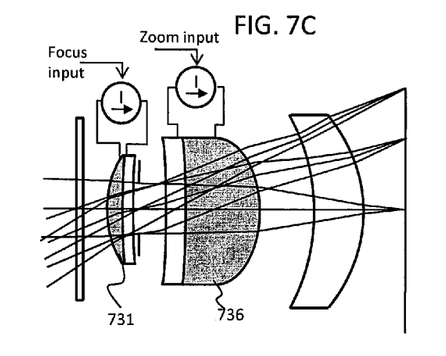
Figure 7D:
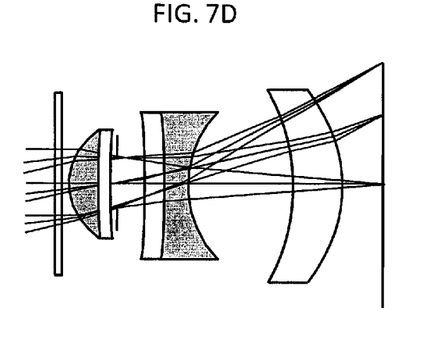
Figure 7E:
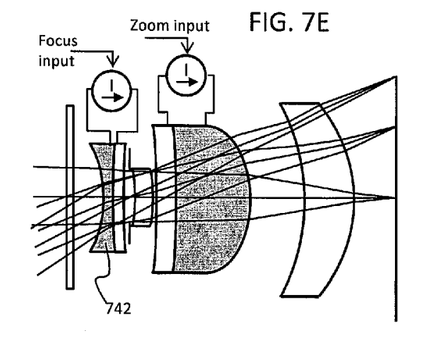
Figure 7F:
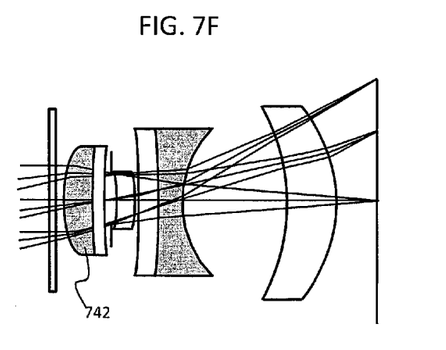

FIG. 7A shows the wide-angle state of a zoom lens that includes the flattener lens 740 with an m- or w-like shape for the correction of field-curvature and higher order aberrations. FIG. 7B shows the corresponding telephoto state of the lens. FIGS. 7C and 7D depict a zoom lens system with only two focus-adjustable lenses (i.e., the lenses 731 and 736) including corrective lens elements and a flattener lens 740. No corrective lens between the focus-adjustable lenses is used in this configuration. FIG. 7E illustrates an example of a zoom lens system where the first focus-adjustable lens 742 has a negative refractive power (i.e. a concave shape in the wide-angle zoom mode). FIG. 7F shows the system in the corresponding telephoto state of the lens with the first deformable lens 742 having a positive refractive power (i.e. a convex shape). It will be appreciated that the various optical elements can be interchanged or eliminated in other examples.

Figure 8A:
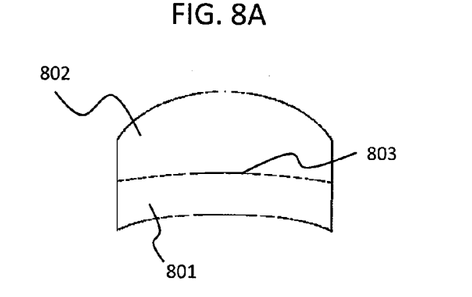
FIGS. 8A and 8B comprise a lens system according to various embodiments of the present invention.
Figure 8B:
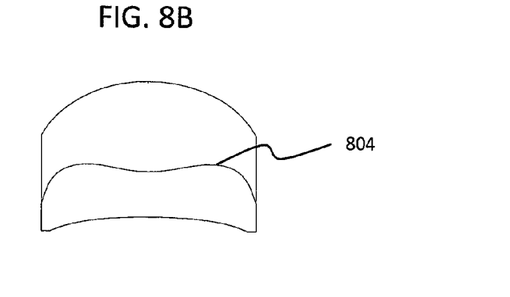

Referring to FIGS. 8A and 8B variants of a deformable lens consisting of a corrective lens element 801 and a filler material 802 are depicted. FIG. 8A shows a preferred version where the interface 803 defined by the corrective optical element 801 and the filler material 802 has no inflection points in its shape at least referring to the portion of the corrective optical element that is optically active. An inflection point that exists in the shape in these elements is generally undesirable as it relates to the temperature sensitivity. If the optical surface has an inflection point, any additional surface order beyond two (quadratic) in the interface between the filler material and the corrective lens element leads to an increased deterioration of the image quality when the temperature deviates from the design temperature as a result of an increased sensitivity to differences in the refractive indices. The elimination of any inflection point eliminates or substantially eliminates these problems. FIG. 8B shows an example of an undesirable embodiment of the interface 804 between the corrective optical element and the filler material. The interface exhibit inflection points on the surface since it is represented by higher order polynomials.

Figure 9:
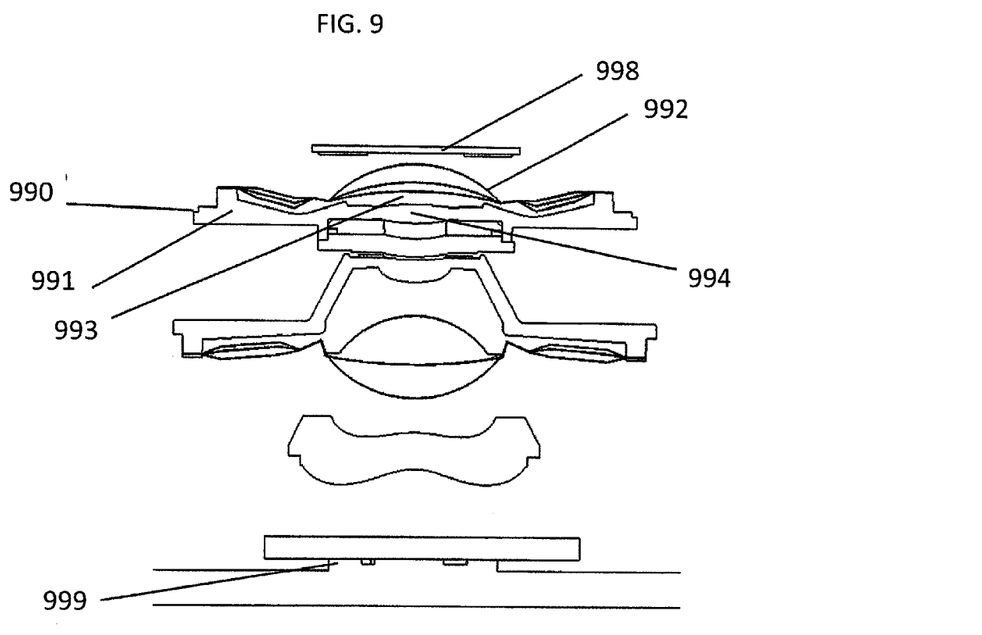
FIG. 9 comprises a diagram of a lens system according to various embodiments of the present invention.

FIG. 9 shows an example of the optical portion of the assembly. This example includes a top variable optical assembly 990 which contains a membrane 992, optical filler material 993, container 991 and a corrective optical element 994 that is embedded (or integrated) in the container 991. This assembly 990 is the farthest optical component away from the sensor 999. This approach provides an assembly that maximizes performance while minimizing height from sensor 999 to cover 998 (e.g., cover glass). A further aspect of this example is having optical elements 994 embedded into the container 991 (e.g., such that the optical elements 994 are in contact with filler material 993). In this example, the second lens can be deformed from positive to negative refractive power allowing a very compact optics design.

In the example of FIG. 9, the magnetic structures are coupled together and also coupled through one or more optical elements of the system (e.g., through the lens, containers, or membranes). The system further feature very small air gaps in both motor structures. Side return structures may be self-attaching to the housing thereby providing easy assembly with no adhesive (e.g., glue) required. These approaches are also fault tolerant from an assembly point of view since the afore mentioned air gaps will be automatically brought in the correct centric position. The magnets are well defined and the posts in the housing define the location of the magnets. All of these structures are according to any approach described in U.S. patent application Ser. No. 12/720,093, filed Mar. 9, 2010, and issued as U.S. Pat. No. 8,699,141 on Apr. 15, 2014, entitled "Lens Assembly System and Method," the contents of which are incorporated by reference in their entirety.

While the present disclosure is susceptible to various modifications and alternative forms, certain embodiments are shown by way of example in the drawings and these embodiments will be described in detail herein. It will be understood, however, that this disclosure is not intended to limit the invention to the particular forms described, but to the contrary, the invention is intended to cover all modifications, alternatives, and equivalents falling within the spirit and scope of the invention.

Preferred embodiments of this invention are described herein, including the best mode known to the inventors for carrying out the invention. It should be understood that the illustrated embodiments are exemplary only, and should not be taken as limiting the scope of the invention.

The invention claimed is:

1. An optical system comprising:
   a first deformable lens including a membrane with a deformable portion and including a filler material, the membrane being separate from the filler material and having a thickness;
   a corrective fixed lens;
   a sensor configured to receive the light focused by the first deformable lens;
   an optical path extending through the first deformable lens and to the sensor;
   wherein the first deformable lens is tuned according to an applied electrical signal in order to directly focus light traversing the optical path onto the sensor;
   wherein the first deformable lens is deformed at least in part by an electromagnetic actuator, the actuator being movable and utilizing a coil;
   wherein the corrective fixed lens is integral with the first deformable lens and such that the corrective fixed lens is in direct contact with the filler material of the deformable lens and configured to correct for monochromatic or polychromatic aberrations, and a first side of the membrane is in contact with the filler material and a second and opposite side of the membrane is in contact with air.

2. The system of claim 1 further comprising a second deformable lens that is disposed within the optical path, the second deformable lens operates with the first deformable lens to focus light traversing the optical path onto the sensor.

3. The system of claim 1 wherein the first deformable lens is configured to change from a concave shape to a convex shape.

4. The system of claim 2 wherein the second deformable lens is configured to change from a convex shape to a concave shape.

5. The system of claim 1 wherein the corrective fixed lens element is constructed from a rigid material.

6. The system of claim 2 wherein an aperture stop is disposed between the two deformable lenses.

7. The system of claim 1 wherein an aperture stop is disposed inside the first deformable lens.

8. The system of claim 1 further comprising a fixed, non-deformable lens disposed in the optical path, wherein the fixed non-deformable lens is constructed from a rigid material, and wherein the fixed, non-deformable lens is configured to correct for monochromatic or spherical aberrations.

9. The system of claim 1 further comprising a second corrective fixed lens disposed in the optical path, wherein the second corrective fixed lens is constructed from a rigid material, the second corrective fixed lens is disposed between a deformable lens closest to the sensor and the sensor.

10. The system of claim 1 wherein an interface defined by the corrective fixed lens and the filler material has no inflection points in its shape where the design light rays pass through.

* * * * *